US010011353B1

(12) United States Patent
Beckman et al.

(10) Patent No.: US 10,011,353 B1
(45) Date of Patent: Jul. 3, 2018

(54) MANEUVERING AN UNMANNED AERIAL VEHICLE WITHOUT CONSIDERING THE EFFECTS OF GRAVITY

(71) Applicant: Amazon Technologies, Inc., Seattle, WA (US)

(72) Inventors: Brian C. Beckman, Newcastle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 14/611,983

(22) Filed: Feb. 2, 2015

(51) Int. Cl.
 *B64C 39/02* (2006.01)
(52) U.S. Cl.
 CPC ...... *B64C 39/024* (2013.01); *B64C 2201/024* (2013.01); *B64C 2201/108* (2013.01); *B64C 2201/14* (2013.01); *B64C 2201/165* (2013.01)
(58) Field of Classification Search
 CPC .............. B64C 39/024; B64C 2201/14; B64C 2201/024; B64C 2201/108; B64C 2201/165
 See application file for complete search history.

(56) References Cited

U.S. PATENT DOCUMENTS

2013/0105635 A1\* 5/2013 Alzu'bi ................. B64C 39/024
 244/23 A

OTHER PUBLICATIONS

Driessens, S. "Towards a More Efficient Quadrotor Configuration". 2013 IEEE/RSJ International Conference on Intelligent Robots and Systems (IROS), Nov. 3-7, 2013. Tokyo, Japan.\*
"The 3D Quadcopter the Latest Advancement in RC Flight". RC Helicopter Fun <www.rchelicopterfun.com/3d-quadcopter.html>; archived version retrieved Jun. 2, 2016.\*
"We've been designing quadcopters incorrectly since day one", Geek.com. Nov. 14, 2013 (see attached PDF).\*

\* cited by examiner

*Primary Examiner* — Mussa A Shaawat
*Assistant Examiner* — Michael V Kerrigan
(74) *Attorney, Agent, or Firm* — Athorus, PLLC (57) ABSTRACT

This disclosure describes an unmanned aerial vehicle ("UAV") that includes a lifting motor and lifting propeller that operate at a rotational speed to generate a force sufficient to maintain the UAV at an altitude. The UAV also includes a plurality of maneuverability motors and propellers that are utilized to stabilize and maneuver the UAV. When a maneuverability command is received, the forces to be generated by each of the maneuverability propellers are determined without considering the full effects of gravity because the lifting motor and lifting propeller effectively cancel out the force of gravity acting upon the UAV.

16 Claims, 5 Drawing Sheets

MANEUVERING AN UNMANNED AERIAL VEHICLE WITHOUT CONSIDERING THE EFFECTS OF GRAVITY

BACKGROUND

Unmanned aerial vehicles ("UAV"), such as aerial, ground and water based automated vehicles, are continuing to increase in use. For example, UAVs are often used by hobbyists to obtain aerial images of buildings, landscapes, etc. Likewise, mobile drive units, such as those provided by Kiva Systems, Inc., are often used in materials handling facilities to autonomously transport inventory within the facility. While there are many beneficial uses of these vehicles, they also have many drawbacks. For example, due to current design limitations, unmanned aerial vehicles are typically designed for either agility or efficiency, but not both.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a UAV and system for altering the perceived gravitational force applied to the UAV. In one implementation, the UAV may include a lifting motor and lifting propeller. The lifting motor may cause the lifting propeller to rotate at a speed sufficient to generate a force with the lifting propeller that is approximately equal and opposite to a force applied to the UAV as a result of gravity (referred to herein as gravitational force). The lifting motor may maintain the rotational speed of the lifting propeller and the UAV will remain at an altitude. To maneuver the UAV, the forces to be applied to the UAV by the maneuverability motors and maneuverability propellers may be determined without considering the full effect of the gravitational force on the UAV, because the gravitational force is effectively canceled out by the force generated by the lifting propeller.

The implementations described herein increase the efficiency of the UAV and allow the maneuverability propellers to operate in a wider range of rotational speeds, angles, pitches, and/or directions. For example, the lifting motor and lifting propeller may be larger in size than the maneuverability motors and maneuverability propellers and selected based on the mass of the UAV and any anticipated payload. In one implementation, the lifting motor and lifting propeller may be selected such that the lifting motor is operating within its most efficient range when causing the lifting propeller to generate a force that is approximately equal to and opposite the gravitational force applied to the UAV.

During transport, UAVs often need different capabilities (e.g., maneuverability, power efficiency) depending on their position and/or their profile. For example, when a UAV is landing, taking off, or in an area with many objects (e.g., a dense area such as a neighborhood, street, etc.), the UAV needs to be agile so that it can avoid colliding with other objects (stationary and/or moving). In comparison, when a UAV is at a high altitude, traveling at a high velocity (e.g., at a cruising altitude), in an area where there are no or few objects, efficiency and power conservation are desirable.

The lifting motors may be designed with larger, more efficient motors than the maneuverability motors, and the lifting propellers may have a larger diameter than the maneuverability propellers. The lifting motors and lifting propellers provide a primary purpose of providing lift and power efficiency to the UAV. For example, the lifting motors and lifting propellers may be positioned toward the center of the body of the UAV and/or at an approximate center of gravity of the UAV.

In comparison, the maneuverability motors may be configured with smaller, more agile motors, and the maneuverability propellers may be smaller propellers designed for providing high agility and maneuverability for the UAV. The maneuverability motors provide a primary purpose of guiding the UAV and providing high agility when needed. For example, when high agility is needed, the lifting motor(s) may be shut down and the UAV may be navigated using the maneuverability motors and maneuverability propellers. In comparison, when agility is not as important and power efficiency is desirable, the lifting motor may be engaged to provide lift to the UAV. The maneuverability motors may then be operated at a lower power draw and/or some of the maneuverability motors may be stopped.

In addition to, or as an alternative to utilizing lifting motors/propellers in combination with maneuverability motors/propellers, the position of one or more of the propellers may be adjustable with respect to the body of the UAV. For example, one or more of the maneuverability motors and maneuverability propellers and/or the lifting motor(s) and lifting propeller(s) may be horizontally, vertically, and/or rotationally moved with respect to the body of the UAV while the UAV is in flight. In one implementation, the motor arms may be rotated, thereby rotating the motors and propellers with respect to the body of the UAV.

While the examples discussed herein primarily focus on UAVs in the form of an aerial vehicle utilizing multiple propellers to achieve flight (e.g., a quad-copter, octo-copter), it will be appreciated that the implementations discussed herein may be used with other forms and/or configurations of UAVs.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using a UAV.

Figure 1:
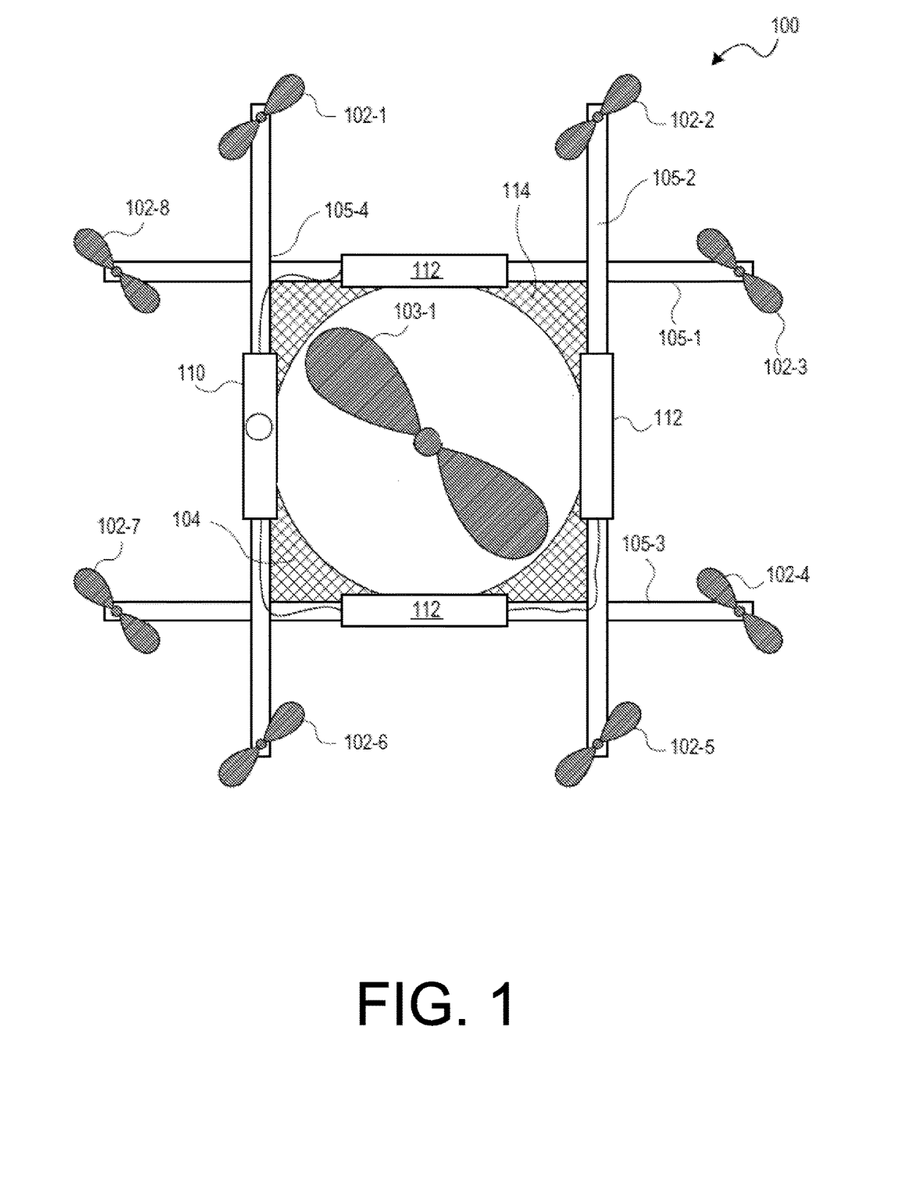
FIG. 1 depicts a block diagram of a top-down view of a UAV, according to an implementation.

FIG. 1 illustrates a block diagram of a top-down view of a UAV 100, according to an implementation. The UAV 100 includes eight maneuverability propellers 102-1, 102-2, 102-3, 102-4, 102-5, 102-6, 102-7, 102-8 and corresponding maneuverability motors (not shown) spaced about the body 104 of the UAV. The propellers 102 may be any form of propeller (e.g., graphite, carbon fiber) and of a size sufficient to lift and/or guide the UAV 100 and any payload engaged by the UAV 100 so that the UAV 100 can navigate through the air, for example, to deliver a payload to a delivery location. In addition to the maneuverability propellers 102, the UAV 100 includes a lifting propeller 103 and a corresponding lifting motor (not shown).

The lifting motor and corresponding lifting propeller are of a size and configuration to generate a force that is approximately equal and opposite to the gravitational force applied to the UAV 100. For example, if the mass of the UAV, without a payload, is 20.00 kilograms (kg), the gravitational force acting on the UAV is 196.20 Newtons (N). If the UAV is designed to carry a payload having a mass between 0.00 kg and 8.00 kg, the lifting motor and lifting propeller may be selected such that when generating a force between 196.00 N and 275.00 N, the lifting motor is operating in its most power efficient range.

To counteract the angle of momentum of the lifting propeller 103, the maneuverability propellers 102 may rotate in a direction opposite that of the lifting propeller 103 to keep the UAV from rotating with the rotation of the lifting propeller 103.

While this example includes eight maneuverability propellers and a lifting propeller, in other implementations, more or fewer maneuverability propellers, maneuverability motors, lifting propellers and/or lifting motors may be utilized. Likewise, in some implementations, the propellers may be positioned at different locations on the UAV 100 and/or at different angles with respect to the body of the UAV 100. For example, rather than or in addition to rotating the maneuverability propellers 102 in a direction opposite the lifting propeller 103, one or more of the maneuverability propellers may be titled at an angle with respect to the lifting propeller 103 to generate an angle of momentum at an amount approximately equal and opposite to that generated by the lifting propeller 103.

Alternative methods of propulsion may also be utilized for either or both of the lifting motors/propellers and/or maneuverability motors/propellers. For example, fans, jets, turbojets, turbo fans, jet engines, and the like may be used to propel the UAV.

The body 104 or housing of the UAV 100 may likewise be of any suitable material, such as graphite, carbon fiber, and/or aluminum. In this example, the body 104 of the UAV 100 includes four rigid members 105-1, 105-2, 105-3, 105-4, or beams, also referred to herein as motor arms, arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some implementations, all of the rigid members 105 may be of approximately the same length while, in other implementations, some or all of the rigid members may be of different lengths. Likewise, the spacing between the two sets of rigid members may be approximately the same or different.

While the implementation illustrated in FIG. 1 includes four rigid members 105 that are joined to form the body 104 and corresponding motor arms, in other implementations, there may be fewer or more components to the body 104. For example, rather than four rigid members, in other implementations, the body 104 of the UAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the body 104. A cavity within the body 104 may be configured to include a payload engagement mechanism for the engagement, transport, and delivery of item(s) and/or containers that contain item(s) (generally referred to herein as a payload).

In some implementations, the UAV may be configured for aerodynamics. For example, an aerodynamic housing may be included on the UAV that encloses the UAV control system 110, one or more of the rigid members 105, the body 104, and/or other components of the UAV 100. The housing may be made of any suitable material(s) such as graphite, carbon fiber, aluminum, etc. Likewise, in some implementations, the location and/or the shape of the payload (e.g., item or container) may be aerodynamically designed. For example, in some implementations, the payload engagement mechanism may be configured such that, when the payload is engaged, it is enclosed within the body and/or housing of the UAV 100 so that no additional drag is created during transport of the payload by the UAV 100. In other implementations, the payload may be shaped to reduce drag and provide a more aerodynamic design of the UAV and the payload. For example, if the payload is a container and a portion of the container extends below the UAV when engaged, the exposed portion of the container may have a curved shape.

The maneuverability propellers 102 and corresponding maneuverability motors are positioned at both ends of each rigid member 105. The maneuverability motors may be any form of motor capable of generating enough speed with the maneuverability propellers to lift the UAV 100 and any engaged payload thereby enabling aerial transport of the payload. For example, the maneuverability motors may each be a FX-4006-13 740 kv multi rotor motor. Likewise, the maneuverability propellers may be of any material and size sufficient to provide lift and maneuverability to the UAV. For example, the maneuverability propellers may be 10 inch-12 inch diameter carbon fiber propellers.

The lifting propeller 103 and corresponding lifting motor are positioned toward a center of the body 104 of the UAV. The lifting motor may be any form of motor capable of generating enough rotational speed with the lifting propeller 103 to create a force that will lift the UAV 100 and any engaged payload thereby enabling aerial transport of the payload. For example, the lifting motor may be a RC Tiger U11 124 KV motor. Likewise, the lifting propeller may be of any material and size sufficient to provide lift to the UAV. For example, the lifting propeller may be a 29 inch-32 inch diameter carbon fiber propeller. As noted above, in some implementations, the lifting propeller and lifting motor may be selected such that the lifting motor operates within its most efficient range when generating a force sufficient to maintain the UAV and any attached payload at a commanded altitude.

Mounted to the body 104 is the UAV control system 110. In this example, the UAV control system 110 is mounted to one side and on top of the body 104. The UAV control system 110, as discussed in further detail below with respect to FIG. 5, controls the operation, routing, navigation, communication, lifting motor control, maneuverability motor control, and the payload engagement mechanism of the UAV 100.

Likewise, the UAV 100 includes one or more power modules 112. In this example, the UAV 100 includes three power modules 112 that are removably mounted to the body 104. The power module for the UAV may be in the form of battery power, solar power, gas power, super capacitor, fuel cell, alternative power generation source, or a combination thereof. For example, the power modules 112 may each be a 6000 mAh lithium-ion polymer battery, or polymer lithium ion (Li-poly, Li-Pol, LIP, LiPo, PLI or Lip) battery. The power module(s) 112 are coupled to and provide power for the UAV control system 110, the propeller motors, and the payload engagement mechanism.

In some implementations, one or more of the power modules may be configured such that it can be autonomously removed and/or replaced with another power module while the UAV is landed. For example, when the UAV lands at a delivery location, relay location and/or materials handling facility, the UAV may engage with a charging member at the location that will recharge the power module.

As mentioned above, the UAV 100 may also include a payload engagement mechanism (not shown). The payload engagement mechanism may be configured to engage and disengage items and/or containers that hold items. In this example, the payload engagement mechanism is positioned beneath the body of the UAV 100. The payload engagement mechanism may be of any size sufficient to securely engage and disengage containers that contain items. In other implementations, the payload engagement mechanism may operate as the container, containing the item(s). The payload engagement mechanism communicates with (via wired or wireless communication) and is controlled by the UAV control system 110.

While the implementations of the UAV 100 discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers and motors to enable vertical takeoff and landing and a fixed wing configuration or a combination wing and propeller configuration to sustain flight while the UAV is airborne.

Figure 2:
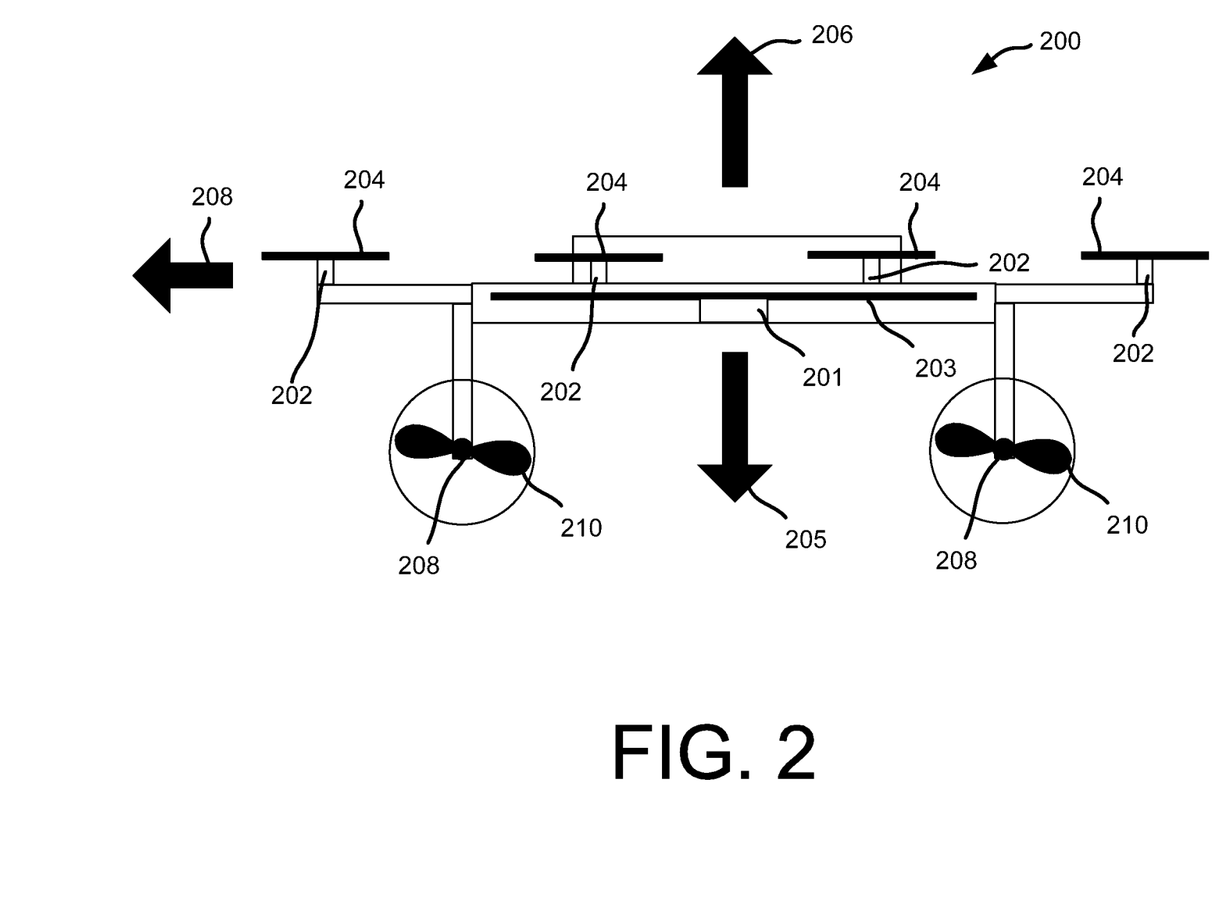
FIG. 2 is a block diagram of a side view of a UAV illustrating the forces generated and/or applied to the UAV, according to an implementation.

FIG. 2 is a block diagram of a side view of a UAV 200 illustrating the forces generated and/or applied to the UAV, according to an implementation. The UAV 200 includes a plurality of maneuverability motors 202 and maneuverability propellers 204 that are configured to stabilize and maneuver the UAV 200 by generating directional forces. Likewise, the UAV 200 includes a lifting motor 201 and lifting propeller 203 configured to generate a vertical force sufficient to lift and maintain the UAV at an altitude.

As identified above, one or more of the maneuverability propellers 204 may rotate in a direction opposite to the rotation of the lifting propellers 203 to generate an angle of momentum that is opposite to that of the lifting propeller to stabilize the UAV 200. Alternatively, one or more of the maneuverability propellers may be titled or offset such that it rotates on a different plane than the lifting propeller 203 and generate an angle of momentum that is offsets to the angle of momentum generated by the lifting propellers 203.

In another implementation, the UAV 200 may include one or more stability motors 208 and corresponding stability propellers 210. In one implementation, the UAV 200 may include two stability motors 208 and corresponding stability propellers 210. The stability motors 208 and stability propellers 210 may be positioned to rotate in a plane that is substantially orthogonal to the rotational plane of the lifting propellers 203 and/or the maneuverability propellers 204 so that the maneuverability propellers generate an angle of momentum that is approximately equal and opposite to the angle of momentum generated by the rotation of the lifting propellers 203 and/or the maneuverability propellers 204. Likewise, the stability motors 208 and corresponding stability propellers 210 may be positioned on opposing ends of the UAV 200, as illustrated, and oriented so they rotate in opposite directions with respect to one another, thereby balancing the rotational forces in the orthogonal plane in which they are rotating.

Continuing with the above example, if the mass of the UAV, without payload, is 20.00 kilograms (kg) the gravitational force 205 acting upon the UAV is 196.133 Newtons (N). If the UAV is designed to carry a payload having a mass between 0.00 kg and 8.00 kg, the lifting motor 201 and lifting propeller 203 may be selected such that when generating a force between 196.00 N and 275.00 N, the lifting motor is operating in its most power efficient range. To keep the UAV at an approximately steady altitude (e.g., hover), the vertical force 206 generated by the lifting propeller is approximately equal and opposite the gravitational force 205. When in hover, the lifting propeller may rotate at a speed sufficient to generate a vertical force 206 that is approximately equal and opposite to the gravitational force 205 and the maneuverability motors and propellers may periodically rotate to generate forces sufficient to stabilize the UAV 200 when other forces (e.g., wind) act upon the UAV.

In some implementations, one or more of the maneuverability motors 202 may be disengaged. Likewise, the direction of rotation of one or more of the maneuverability propellers may be altered to generate either a positive vertical force or a negative vertical force. In another example, the pitch of one of more of the maneuverability propellers 204 and/or the lifting propeller 203 may be altered to increase or decrease the generated force without altering the rotational speed of the propeller. In still another example, the angle of one or more of the maneuverability propellers and/or the lifting propeller may be altered to generate directional forces other than vertical. The angle of the propellers may be altered by altering the pitch and/or roll of the UAV 200 and/or by altering the angle of the propeller with respect to the body of the UAV 200.

In traditional UAV configurations, if a maneuver command is received instructing the UAV 200 to move in a horizontal direction 208, the forces to be generated by each of the motor and propeller pairs is determined that considers not only the direction of movement but also the gravitational force. For example, in a traditional UAV, if the UAV receives a maneuver command to travel in a horizontal direction 208 with a velocity of 20.0 meters/second (m/s) and without changing altitude, the sum of all the forces acting on the UAV must be considered and a force determined for each of the propellers and motors.

To determine the force to be generated by each of the propellers (assuming no other environmental forces), the directional force needed to move the UAV 200 can be separated into horizontal and vertical components. In this example, the gravitational force 205 is 196.133 N in the negative direction. As such, a positive vertical force of 196.133 N is needed to maintain the current altitude of the UAV. The horizontal force needed to move the UAV 200 at a velocity of 20.0 m/s second can be determined from the following equation:

$$F_h = C_d * \frac{\rho * v^2}{2} * A$$

where $C_d$ is the drag coefficient, $\rho$ is the density of the air, v is velocity, A is the presented area of the UAV, also referred to as the reference area, and $F_h$ is the horizontal force. The drag coefficient, a dimensionless number, includes all the complex dependences such as air conditions, shape of the UAV, inclination of the UAV, form drag, skin friction drag, wage drag, and induced drag. The drag coefficient therefore depends on the configuration of the UAV, among other variables, and may be determined through experimentation and/or during navigation as part of a command feedback. For purposes of this discussion, we will assume that the drag coefficient is 0.10. Density of air depends on the temperature and the particles in the air. Assuming dry air at a temperature of 20 degrees Celsius, the density is 1.2041 kg/m³. Finally, the presented area of the UAV depends on the pitch, roll, size, and shape of the UAV. For this example, we will assume the presented area is 0.5 m².

Using the above factors, the horizontal force can be computed as:

$$F_h = 0.1 * \frac{1.2041 * 20^2}{2} * 0.5 = 12.041 \ N$$

Summing the vertical force (196.133 N) and the horizontal force (12.041 N), the UAV must generate a total force ($F_t$) of 196.502 N ($F_v^2 + F_h^2 = F_t^2$).

While such a system provides high agility and maneuverability for the UAV, distributing the total forces needed to control the UAV among all the propellers results in the motors frequently not operating within their most efficient ranges, thereby resulting in an inefficient use of power.

With the implementations described herein, the lifting propeller 203 and lifting motor 201 can be pre-selected such that when the vertical force generated by the lifting propeller is 196.133 N the lifting motor 201 is operating in its most efficient range. When a maneuver command is received instructing the UAV 200 to move in the horizontal direction 208 at a speed of 20.0 m/s, the horizontal force of 12.041 N can be determined and distributed among one or more of the maneuverability motors 202. For example, if the maneuverability motors 202 are at their most efficient range when the maneuverability propellers are generating 6.00 N of force, the angle of two of the maneuverability propellers may be altered to be approximately ninety degrees with respect to the UAV 200 and the total horizontal force of 12.041 N distributed between those two maneuverability propellers, thereby propelling the UAV 200 in the commanded direction in a more efficient manner. The remaining maneuverability motors/propellers may be disengaged or periodically engaged to stabilize the UAV 200.

As can be seen from a comparison of the traditional UAV, which requires the total force to be distributed among all the propellers, and the implementations described herein, which allocate the vertical force to a lifting propeller and allocate the remaining horizontal force of only 12.041 N to the maneuverability propellers, there is a much larger range of operational values available to the maneuverability motors. The increased operational range for the maneuverability propellers allows greater operational efficiency in maneuvering the UAV.

By separating the vertical force from the horizontal force to be generated by the UAV, the total force to be generated by the maneuverability motors 202 and maneuverability propellers 203 is greatly reduced. Likewise, the computations to be performed by corresponding motor controllers (e.g., electronic speed controls) are simplified. For example, the motor controller for the lifting motor and lifting propeller only needs to compute the force necessary for lifting the UAV. Likewise, the maneuverability motor controllers for the maneuverability motors only need to compute the forces necessary to stabilize and maneuver the UAV 200.

In some implementations, one or more of the motor controllers may include a feedback component that provides information to other motor controllers. For example, the maneuverability motor controllers may provide feedback to the lifting motor controller identifying the forces generated by the maneuverability motors and maneuverability propellers and the lifting motor controller may utilize this information to increase and/or decrease the force generated by the lifting motor and lifting propeller. For example, in some implementations, the control signals sent to the maneuverability motors may be selected so that the maneuverability motors operate within the most efficient ranges when maneuvering the UAV. In such an implementation, the forces generated by the maneuverability propellers may be determined and the lifting motor may cause the lifting propeller to rotate at a speed necessary to provide any additional lift needed to maintain the UAV at an intended altitude and/or to alter the altitude of the UAV.

In comparison, the lifting motor controller may provide feedback information to the maneuverability motor controllers identifying the lifting force generated by the lifting motor and lifting propeller. The maneuverability motor controllers may utilize this information to adjust the perceived gravitational force applied to the UAV when computing forces for generating maneuvers or altering the attitude of the UAV 200.

In other implementations, rather than altering the angle of one or more of the maneuverability propellers, the angle of the UAV 200 may be altered to navigate in the desired direction. In such an implementation, the lifting propeller and the engaged maneuverability propellers will be generating both horizontal and vertical forces to move the UAV in the desired direction, but the majority of the vertical force will be provided by the lifting propellers. In still other implementations, rather than, or in addition to altering the rotational speed of the propellers, the pitch of the propellers may be altered to either increase or decrease the force generated by the propellers. Likewise, in some implementations, the direction of rotation of one or more of the maneuverability propellers may be altered to alter the direction of generated force. For example, if the angle of the UAV is to be altered, the directional rotation of one or more of the maneuverability propellers on one side of the UAV 200 on the opposite side of the UAV 200 may rotate to generate a downward force and one or more of the maneuverability propellers 204 may rotate in an opposite direction to generate an upward force, thereby altering the angle of the UAV 200. As will be appreciated, any combination of rotational speed, pitch, angle, and/or direction may be utilized to propel the UAV 200.

Figure 3:
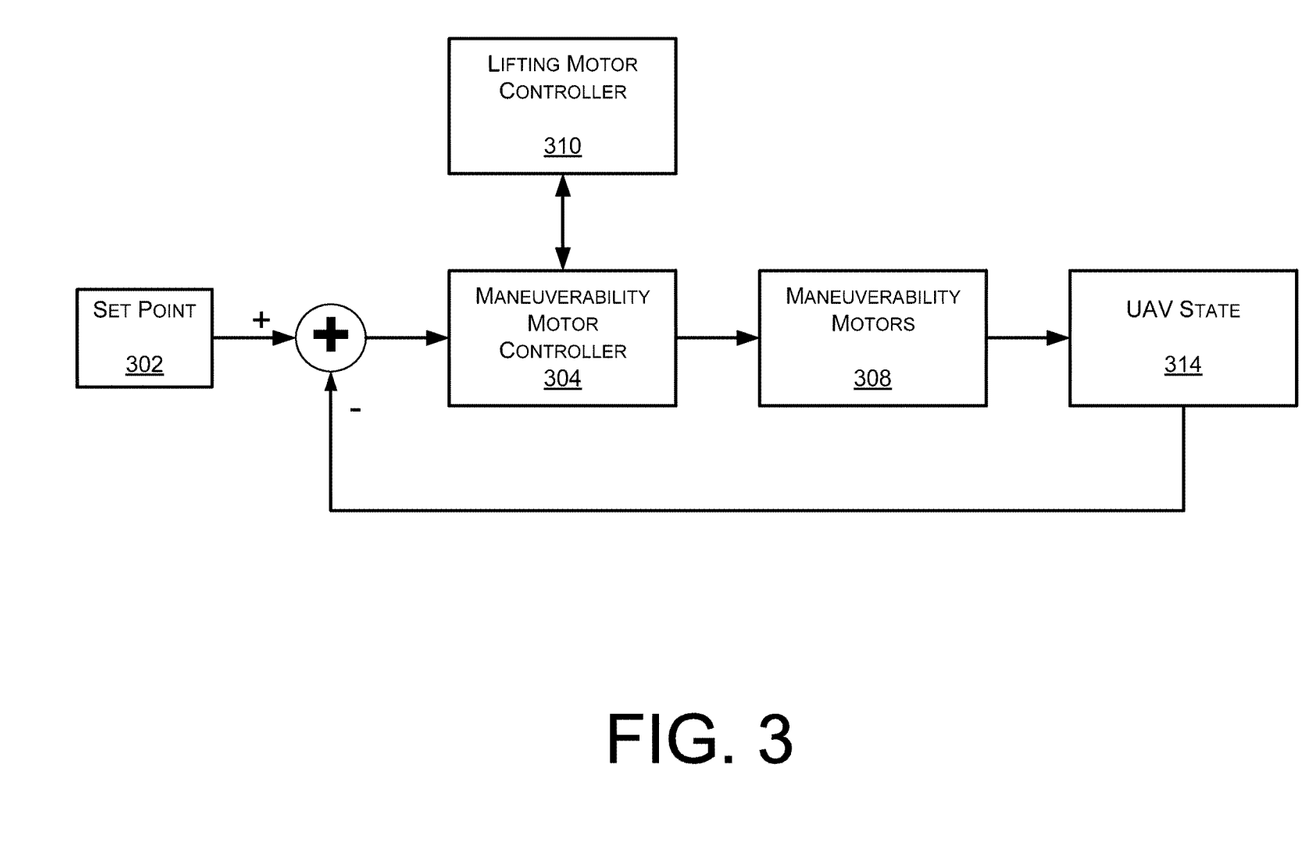
FIG. 3 is a block diagram illustrating the determination of forces to be generated by maneuverability propellers in response to a maneuverability command, according to an implementation.

FIG. 3 is a block diagram illustrating the determination of forces to be generated by maneuverability propellers in response to a maneuverability command and the corresponding state information of the UAV, including the Euler angles, position, and velocity of the UAV, according to an implementation. A maneuverability command 302, which may be received from a remote source (e.g., controller) or from the UAV control system 110, etc., may include one or more of a pitch, yaw, roll, pitch rate, yaw rate, and/or roll rate, collectively referred to herein as a set point 302. The set point may then be provided to a summer 304. The summer 304 determines the error by computing the difference between the current yaw, pitch, roll, yaw rate, pitch rate, and roll rate of the UAV (collectively the "plant variable") and the set point 302. The error is then provided to the controller 306.

The controller 306 utilizes the error from the summer 304 along with the perceived gravity 310 to produce motor commands. As discussed above, the perceived gravity is determined based on the difference between the actual gravitational force and the vertical force generated by the lifting motor(s) and lifting propeller(s) of the UAV. In some implementations, the perceived gravity may be approximately zero. The motor commands identify the speed of rotation, pitch, direction of rotation and/or angle for each of the maneuverability motors.

The motor commands are received by the motors 308 and the rotational speed of each of the maneuverability motors is updated based on the motor commands. In some implementations, the motor commands may also be provided back to the gravitational controller 310. For example, if the maneuverability commands include a vertical component that will result in the UAV gaining altitude if there no perceived gravity, the gravitational controller 310 may receive those commands and reduce the rotational speed of the lifting propellers so that the total vertical forces of the lifting propellers and the maneuverability propellers remains approximately constant and the UAV maintains the commanded altitude.

As the UAV is maneuvered according to the motor commands, the UAV state 314 is updated and provided as a feedback to the summer 304.

Figure 4:
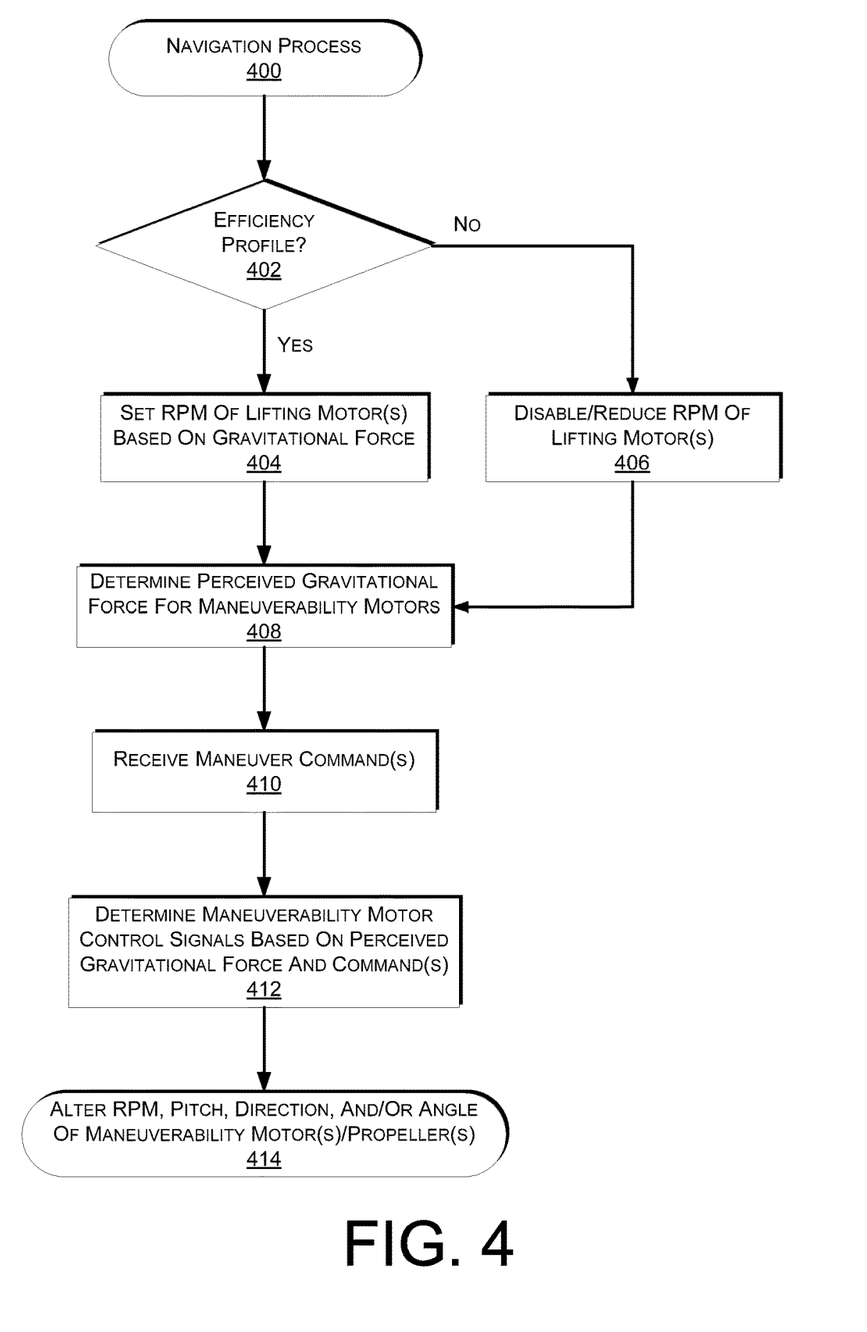
FIG. 4 is a flow diagram illustrating an example navigation process, according to an implementation.

FIG. 4 is a flow diagram illustrating an example navigation process 400, according to an implementation. The example process of FIG. 4 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example navigation process 400 begins by determining if the UAV is to be operating an efficiency profile or an agility profile, as in 402. In the agility profile, the UAV may be configured for high agility. In comparison, in the efficiency profile, the UAV may be configured for increased power efficiency. A profile may be determined and selected based at least in part on the position or location of the UAV. For example, the position of the UAV may include the altitude of the UAV, a velocity of the UAV, whether other objects are within a close proximity of and/or approaching the UAV, etc. Objects may be considered within a close proximity of a UAV if they are within a defined distance (e.g., 50 ft., 100 ft.) of the UAV. If the UAV is traveling at a high altitude and there are no or few objects, it may be determined that the UAV should use an efficiency profile. In comparison, during landing, take off, or when operating in areas with several objects nearby, it may be determined that the UAV should operate using an agility profile.

If it is determined that the UAV is to operate according to an efficiency profile, the rotational speed (rpm) of the lifting motor is determined based on the gravitational force applied to the UAV, as in 404. For example, if the UAV has a mass of 20.00 kg, the gravitational force is 196.133 N. As such, the rpm of the lifting motor is set so that the lifting propeller generates a force that is equal and opposite to the gravitational force.

If it is determined that the UAV is not to operate according to the efficiency profile (e.g., it is to operate according to an agility profile) the lifting motor is disengaged and/or the rpm is reduced, as in 406. Lifting and navigating the UAV with just the maneuverability motors and maneuverability propellers increases the agility of the UAV, but consumes more power. in some implementations, there may be a transition between an efficiency profile and an agility profile, where the rpm of the lifting motor is reduced so that the lifting forces necessary to maintain altitude of the UAV are generated using both the lifting propellers and the maneuverability propellers.

Upon setting the rpm of the lifting motor, the perceived gravitation force, from the perspective of the maneuverability motors and maneuverability propellers, is determined. In some implementations, if the lifting motor and lifting propeller are generating a force that is approximately equal and opposite to the gravitational force acting on the UAV, the perceived gravitational force from the perspective of the UAV is approximately zero. In such an implementation, the maneuverability motors and maneuverability propellers only need to generate forces sufficient to stabilize the UAV, alter the attitude of the UAV, and/or alter the directional speed of the UAV.

As part of the navigation process 400, a maneuver command is received, which may include one or more of a pitch command, roll command, a yaw command or a thrust command, as in 400. The maneuver command may be received from a remote source, such as a remote computing component, a remote controller, etc. and/or generated by the UAV control system. For example, if the UAV is to navigate a determined path, the UAV control system may generate maneuver commands to be executed so that the UAV remains and/or follows the determined path.

In response to receiving the maneuver command, maneuverability motor control signals are determined for each maneuverability motor based on the perceived gravitational forces and the maneuver command, as in 412. For example, if the maneuver command is a command to move in a horizontal direction at 20.0 m/s and the UAV is operating according to an efficiency profile such that the perceived gravitational force acting upon the UAV is approximately zero, the example process 400 will determine the horizontal forces needed to navigate the UAV in the horizontal direction at a speed of 20.0 m/s.

Based on the determined maneuverability motor control signals, the rpm of one or more of the maneuverability motors, the pitch of one or more of the maneuverability propellers, the direction of one of more of the maneuverability propellers and or the angle of one or more of the maneuverability propellers may be altered to generate a force corresponding to the maneuverability motor control signals determined at block 412, as in 414. The alterations made to the maneuverability motors and maneuverability propellers may be the same or different for each maneuverability motor or maneuverability propeller.

Figure 5:
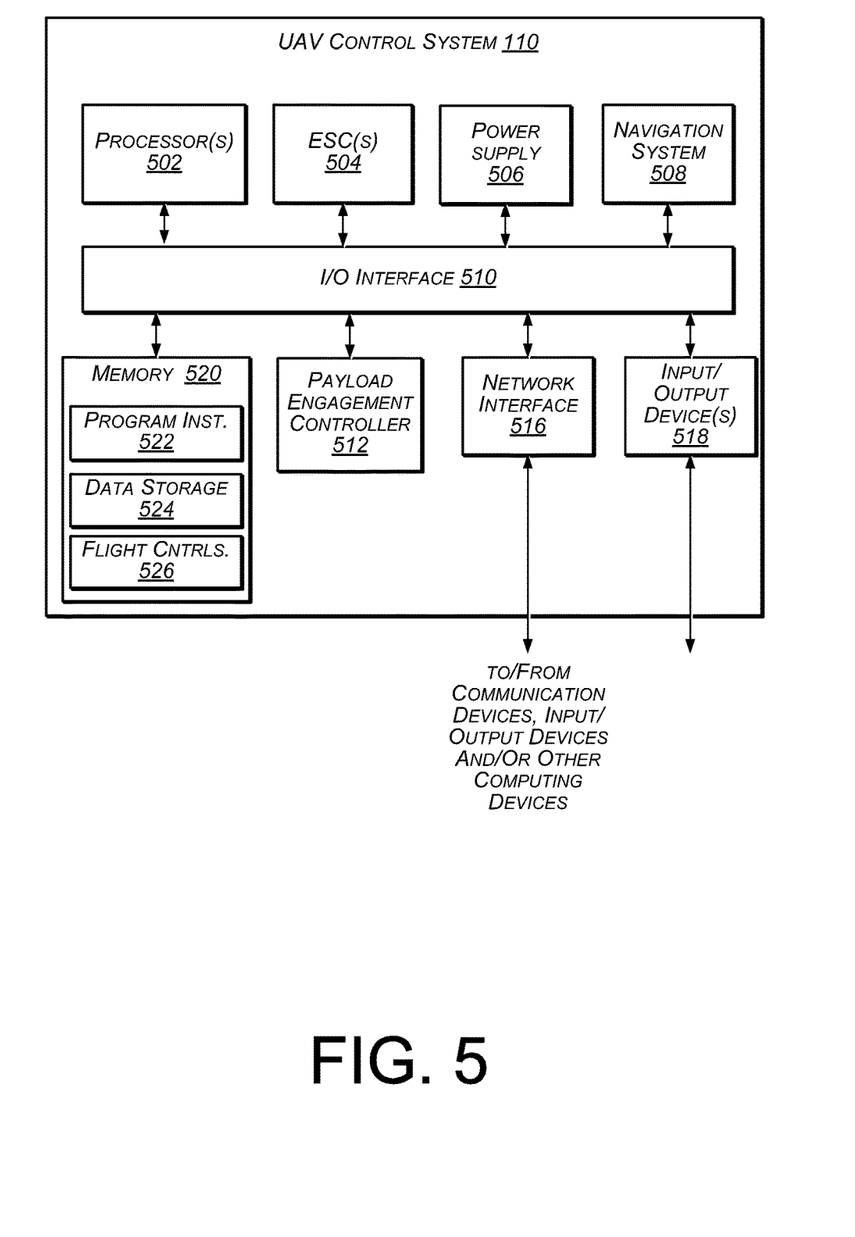
FIG. 5 is a block diagram illustrating various components of an unmanned aerial vehicle control system, according to an implementation.

FIG. 5 is a block diagram illustrating an example UAV control system 110 of the UAV 100. In various examples, the block diagram may be illustrative of one or more aspects of the UAV control system 110 that may be used to implement the various systems and methods discussed herein and/or to control operation of the UAV 100. In the illustrated implementation, the UAV control system 110 includes one or more processors 502, coupled to a memory, e.g., a non-transitory computer readable storage medium 520, via an input/output (I/O) interface 510. The UAV control system 110 also includes motor controllers 504, such as electronic speed controls (ESCs), power supply modules 506 and/or a navigation system 508. The UAV control system 110 further includes a payload engagement controller 512, a network interface 516, and one or more input/output devices 518.

In various implementations, the UAV control system 110 may be a uniprocessor system including one processor 502, or a multiprocessor system including several processors 502 (e.g., two, four, eight, or another suitable number). The processor(s) 502 may be any suitable processor capable of executing instructions. For example, in various implementations, the processor(s) 502 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 502 may commonly, but not necessarily, implement the same ISA.

The non-transitory computer readable storage medium 520 may be configured to store executable instructions, data, flight paths, profiles, flight control parameters, center of gravity information, and/or data items accessible by the processor(s) 502. In various implementations, the non-transitory computer readable storage medium 520 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 520 as program instructions 522, data storage 524 and flight controls 526, respectively. In other implementations, program instructions, data, and/or flight controls may be received, sent, or stored upon different types of computer-accessible media, such as non-transitory media, or on similar media separate from the non-transitory computer readable storage medium 520 or the UAV control system 110. Generally speaking, a non-transitory, computer readable storage medium may include storage media or memory media such as magnetic or optical media, e.g., disk or CD/DVD-ROM, coupled to the UAV control system 110 via the I/O interface 510. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 516.

In one implementation, the I/O interface 510 may be configured to coordinate I/O traffic between the processor(s) 502, the non-transitory computer readable storage medium 520, and any peripheral devices, the network interface or other peripheral interfaces, such as input/output devices 518. In some implementations, the I/O interface 510 may perform any necessary protocol, timing or other data transformations to convert data signals from one component (e.g., non-transitory computer readable storage medium 520) into a format suitable for use by another component (e.g., processor(s) 502). In some implementations, the I/O interface 510 may include support for devices attached through various types of peripheral buses, such as a variant of the Peripheral Component Interconnect (PCI) bus standard or the Universal Serial Bus (USB) standard, for example. In some implementations, the function of the I/O interface 510 may be split into two or more separate components, such as a north bridge and a south bridge, for example. Also, in some implementations, some or all of the functionality of the I/O interface 510, such as an interface to the non-transitory computer readable storage medium 520, may be incorporated directly into the processor(s) 502.

The motor controllers 504 communicate with the navigation system 508 and adjust the rotational speed of each lifting motor and/or the pushing motor to stabilize the UAV and guide the UAV along a determined flight path.

The navigation system 508 may include a global positioning system (GPS), indoor positioning system (IPS), or other similar system and/or sensors that can be used to navigate the UAV 100 to and/or from a location. The payload engagement controller 512 communicates with the actuator(s) or motor(s) (e.g., a servo motor) used to engage and/or disengage items.

The network interface 516 may be configured to allow data to be exchanged between the UAV control system 110, other devices attached to a network, such as other computer systems (e.g., remote computing resources), and/or with UAV control systems of other UAVs. For example, the network interface 516 may enable wireless communication between the UAV 100 and a UAV control system that is implemented on one or more remote computing resources. For wireless communication, an antenna of the UAV or other communication components may be utilized. As another example, the network interface 516 may enable wireless communication between numerous UAVs. In various implementations, the network interface 516 may support communication via wireless general data networks, such as a Wi-Fi network. For example, the network interface 516 may support communication via telecommunications networks, such as cellular communication networks, satellite networks, and the like.

Input/output devices 518 may, in some implementations, include one or more displays, imaging devices, thermal sensors, infrared sensors, time of flight sensors, accelerometers, pressure sensors, weather sensors, etc. Multiple input/output devices 518 may be present and controlled by the UAV control system 110. One or more of these sensors may be utilized to assist in landing as well as to avoid obstacles during flight.

As shown in FIG. 5, the memory may include program instructions 522, which may be configured to implement the example routines and/or sub-routines described herein. The data storage 524 may include various data stores for maintaining data items that may be provided for determining flight paths, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 110 is merely illustrative and is not intended to limit the scope of the present disclosure. In particular, the computing system and devices may include any combination of hardware or software that can perform the indicated functions. The UAV control system 110 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 110. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the UAV control system 110 may be transmitted to the UAV control system 110 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method to control lift and maneuverability of an unmanned aerial vehicle ("UAV"), the method comprising:
    rotating, with a lifting motor, a lifting propeller at a first rotational speed sufficient to generate a first vertical force that is approximately equal and opposite to a second vertical force applied to the UAV due to gravity based at least in part on a mass of the UAV;
    receiving a maneuver command to maneuver the UAV in a direction;
    determining a third vertical force and a first horizontal force needed to navigate the UAV in the direction corresponding to the maneuver command, wherein the third vertical force and the first horizontal force are determined based at least in part on not considering the second vertical force applied to the UAV due to gravity based at least in part on the mass of the UAV; and
    generating, using at least one maneuverability propeller, a directional force that is approximately equal to a sum of the third vertical force and the first horizontal force;
    wherein generating the directional force includes altering at least an orientation of the at least one maneuverability propeller with respect to a body of the UAV based at least in part on a respective efficient operating range of a maneuverability motor coupled to the at least one maneuverability propeller such that the maneuverability motor operates within the respective efficient operating range.

2. The method of claim 1, further comprising:
    maintaining, in response to the maneuver command, the lifting propeller at approximately the first rotational speed.

3. The method of claim 1, wherein generating the directional force includes:
    altering a pitch of the at least one maneuverability propeller.

4. The method of claim 1, wherein generating the directional force includes:

adjusting a rotational speed of the at least one maneuverability propeller.

5. An unmanned aerial vehicle ("UAV"), comprising:
a body;
a first lifting motor coupled to the body, the first lifting motor coupled to a first lifting propeller and configured to rotate the first lifting propeller at a first rotational speed, wherein the first lifting motor and the first lifting propeller are configured to provide a first force to the UAV that is approximately equal and opposite to a second force applied to the UAV due to gravity based at least in part on a mass of the UAV;
a plurality of maneuverability motors, each of the plurality of maneuverability motors:
coupled to the body,
coupled to a maneuverability propeller, and
configured to rotate the maneuverability propeller to provide vertical lift and maneuverability to the UAV;
a plurality of maneuverability motor controllers, each of the plurality of maneuverability motor controllers coupled to a maneuverability motor and configured to:
receive a maneuverability command;
determine a force to be generated by the maneuverability propeller to cause the UAV to move in a direction corresponding to the maneuverability command, wherein the force is determined without considering a full effect of a gravitational force applied to the UAV due to gravity based at least in part on the mass of the UAV; and
send a signal to the maneuverability motor instructing the maneuverability motor to cause the maneuverability propeller to generate the determined force;
wherein the signal sent to the maneuverability motor includes an instruction to alter at least an orientation of the maneuverability propeller based at least in part on a respective efficient operating range of the maneuverability motor such that the maneuverability motor operates within the respective efficient operating range.

6. The UAV of claim 5, further comprising:
a lifting motor controller:
coupled to the first lifting motor; and
configured to determine a vertical force to be generated by the first lifting propeller based at least in part on the mass of the UAV.

7. The UAV of claim 6, wherein the lifting motor controller is further configured to at least:
determine a vertical force generated by the maneuverability propellers; and
send a signal to the first lifting motor to alter a force generated by the first lifting propeller to account for the vertical force generated by the maneuverability propellers.

8. The UAV of claim 5, wherein the signal sent to the maneuverability motor includes an instruction to alter at least one of: a rotational speed of the maneuverability propeller, a direction of the maneuverability propeller, or a pitch of the maneuverability propeller.

9. The UAV of claim 5, wherein the first lifting propeller has a larger diameter than the maneuverability propellers.

10. The UAV of claim 9, further comprising:
a memory coupled to a processor and storing program instructions that when executed by the processor causes the processor to at least:
determine a position of the UAV;
send a signal to a lifting motor controller to cause the first lifting motor to stop a rotation of the first lifting propeller when the unmanned aerial vehicle is in a first position, wherein the first position is associated with at least one of a low altitude or an area with an object in a close proximity of the unmanned aerial vehicle; and
send a signal to at least one of the maneuverability motor controllers to cause at least one of the plurality of maneuverability motors to rotate a respective maneuverability propeller when the unmanned aerial vehicle is in the first position.

11. The UAV of claim 5, wherein the UAV includes a plurality of lifting motors and corresponding lifting propellers.

12. The UAV of claim 5, further comprising:
a stability motor coupled to the body, the stability motor coupled to a stability propeller and positioned approximately orthogonal to the first lifting propeller, wherein the stability motor is configured to rotate the stability propeller at a rate sufficient to offset an angular momentum generated by the rotation of the first lifting propeller.

13. A computer-implemented method to control a lift and maneuverability of an unmanned aerial vehicle ("UAV"), comprising:
causing, while the UAV is in flight, a lifting motor to rotate a lifting propeller at a rotational speed sufficient to generate a vertical force that is approximately equal and opposite to a gravitational force applied to the UAV due to gravity based at least in part on a mass of the UAV;
determining a force needed to alter a movement of the UAV, wherein the force is determined without considering a full effect of the gravitational force acting upon the UAV based at least in part on the mass of the UAV;
causing, while the UAV is in flight, a plurality of maneuverability motors to generate the force and alter the movement of the UAV; and
causing alteration of at least an orientation of a maneuverability propeller with respect to the UAV based at least in part on a respective efficient operating range of a maneuverability motor coupled to the maneuverability propeller such that the maneuverability motor operates within the respective efficient operating range.

14. The computer-implemented method of claim 13, wherein:
a first maneuverability motor rotates a first maneuverability propeller in a first direction to cause a positive vertical force to be applied to the UAV; and
a second maneuverability motor rotates a second maneuverability propeller in a second direction to cause a negative vertical force to be applied to the UAV.

15. The computer-implemented method of claim 13, further comprising:
causing alteration of at least one of: a pitch of a maneuverability propeller, a rotational speed of a maneuverability propeller, or a direction of rotation of a maneuverability propeller.

16. The computer-implemented method of claim 13, further comprising:
altering a rotational speed of the lifting propeller or at least one of the maneuverability propellers in response to a change in a pitch of the UAV.

* * * * *